US011361335B2

(12) United States Patent
Malik et al.

(10) Patent No.: US 11,361,335 B2
(45) Date of Patent: Jun. 14, 2022

(54) MACHINE LEARNING ENGINE FOR DEMAND-BASED PRICING

(71) Applicant: Fair IP, LLC, Santa Monica, CA (US)

(72) Inventors: Daniel J. Malik, Sierra Madre, CA (US); Joshua S. Schoenfield, Los Angeles, CA (US); John Case, Los Angeles, CA (US); Scott Edward Painter, Los Angeles, CA (US)

(73) Assignee: FAIR IP, LLC, Beverly Hills, CA (US)

( * ) Notice: Subject to any disclaimer, the term of this patent is extended or adjusted under 35 U.S.C. 154(b) by 101 days.

(21) Appl. No.: 16/914,208

(22) Filed: Jun. 26, 2020

(65) Prior Publication Data

US 2020/0410518 A1 Dec. 31, 2020

Related U.S. Application Data

(60) Provisional application No. 62/883,374, filed on Aug. 6, 2019, provisional application No. 62/868,535, filed on Jun. 28, 2019.

(51) Int. Cl.
*G06N 20/00* (2019.01)
*G06Q 30/02* (2012.01)
(Continued)

(52) U.S. Cl.
CPC ......... *G06Q 30/0206* (2013.01); *G06N 20/00* (2019.01); *G06Q 20/102* (2013.01);
(Continued)

(58) Field of Classification Search
CPC ............ G06Q 30/0206; G06Q 20/102; G06Q 30/0201; G06Q 30/0278; G06Q 30/0283; G06Q 30/0627; G06N 20/00
See application file for complete search history.

(56) References Cited

U.S. PATENT DOCUMENTS 8,160,917 B1  4/2012  Solanki
8,660,943 B1  2/2014  Chirehdast
(Continued)

FOREIGN PATENT DOCUMENTS

CN    107180367 A  *  9/2017

OTHER PUBLICATIONS

Berry, S., Levinsohn, J., & Pakes, A. (1995). Automobile Prices in Market Equilibrium. Econometrica (1986-1998), 63(4), 841. (Year: 1995).*

(Continued)

*Primary Examiner* — Patricia H Munson
*Assistant Examiner* — Nicholas D Bolen
(74) *Attorney, Agent, or Firm* — Sprinkle IP Law Group

(57) ABSTRACT

Systems, methods and products for determining a consumer-facing price using a demand model that is generated based on historical transactional data. One embodiment comprises a method implemented in a pricing module of an automotive data processing system. Data that identifies a consumer (or consumer group) and a vehicle type are received and the demand model is accessed to generate a payment corresponding to the attributes of the consumer and the attributes of the vehicle type. The demand model may be implemented in a machine learning engine that maintains a set of weights β used in a predictive demand function. The weights are adjusted by the machine learning engine to minimize a loss function which measures deviation of demand estimated by the predictive demand function from the demand indicated by a set of historical transaction data.

16 Claims, 4 Drawing Sheets

(51) Int. Cl.
  *G06Q 20/10* (2012.01)
  *G06Q 30/06* (2012.01)

(52) U.S. Cl.
  CPC ..... *G06Q 30/0201* (2013.01); *G06Q 30/0278* (2013.01); *G06Q 30/0283* (2013.01); *G06Q 30/0627* (2013.01)

(56) References Cited

U.S. PATENT DOCUMENTS

| | | |
|---|---|---|
| 2008/0183616 A1 | 7/2008 | Hankey |
| 2009/0164262 A1 | 6/2009 | Ettl |
| 2010/0179861 A1 | 7/2010 | Teerilahti |
| 2011/0178839 A1 | 7/2011 | Adra |
| 2012/0303474 A1 | 11/2012 | Sanel |
| 2013/0197971 A1 | 8/2013 | Wilke |
| 2014/0136443 A1* | 5/2014 | Kinsey, II .......... G06Q 30/0631 705/347 |
| 2014/0214696 A1* | 7/2014 | Laughlin ............ G06Q 30/0278 705/306 |
| 2014/0278837 A1* | 9/2014 | Blumer .................. G07B 15/00 705/13 |
| 2014/0279263 A1* | 9/2014 | Liu .................... G06Q 30/0627 705/26.63 |
| 2015/0213518 A1* | 7/2015 | Krishnamurthy .. G06Q 30/0278 705/39 |
| 2016/0196527 A1* | 7/2016 | Bose .................... G06Q 10/067 705/332 |
| 2017/0169399 A1* | 6/2017 | Areshidze ............ G07C 5/0841 |
| 2017/0270580 A1* | 9/2017 | Esposito ............ G06Q 30/0605 |
| 2017/0316459 A1* | 11/2017 | Strauss ................ G06Q 10/067 |
| 2020/0057918 A1* | 2/2020 | Shin ..................... G06K 9/6257 |
| 2020/0134709 A1 | 4/2020 | Lewison |
| 2020/0167811 A1 | 5/2020 | Aggarwal |
| 2020/0254897 A1 | 8/2020 | Loghavi |
| 2020/0140465 A1 | 12/2020 | Dalinina |

OTHER PUBLICATIONS

Office Action for U.S. Appl. No. 16/914,207, dated Nov. 23, 2021, 11 pgs.

\* cited by examiner

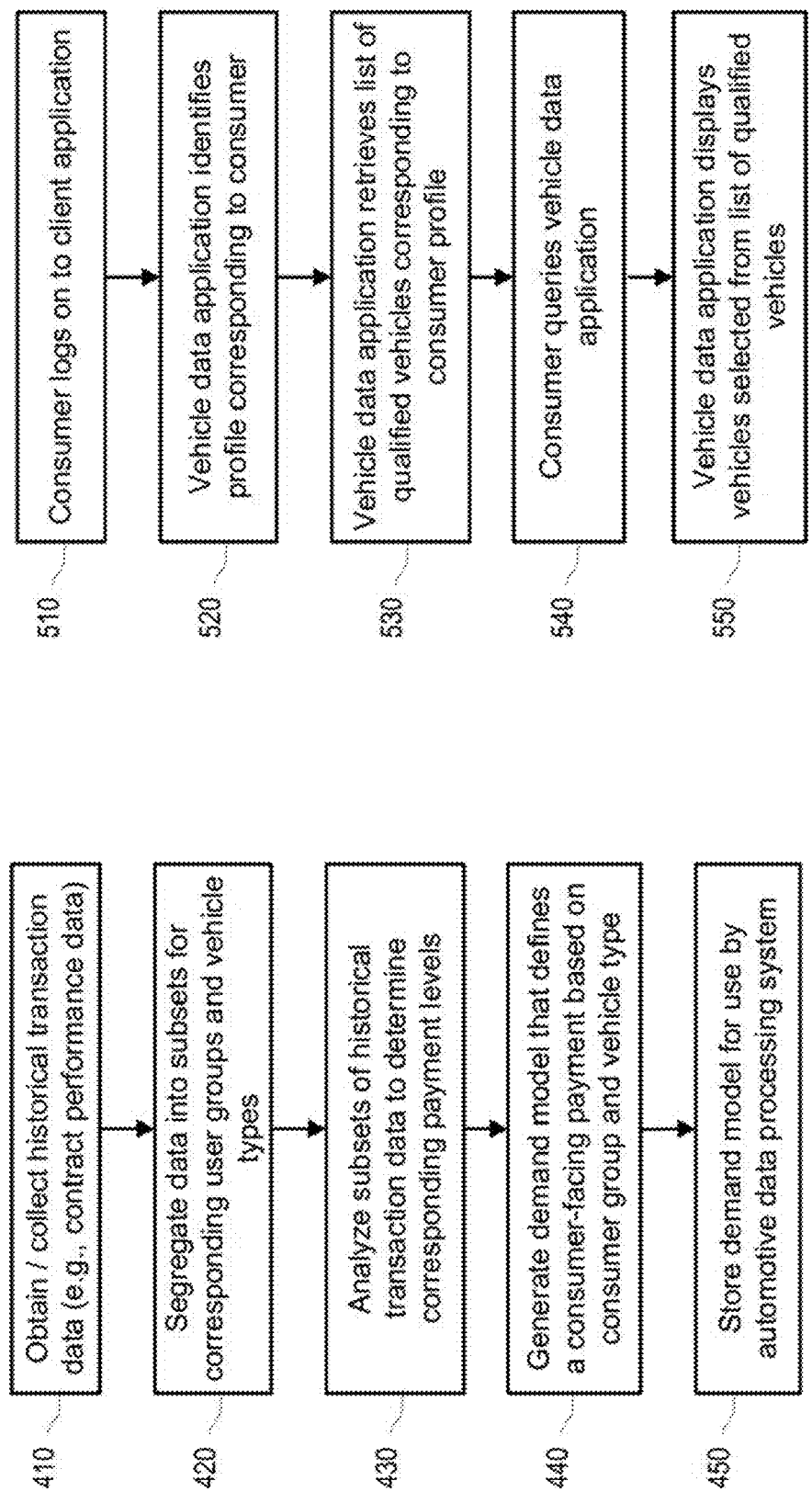

MACHINE LEARNING ENGINE FOR DEMAND-BASED PRICING

RELATED APPLICATIONS

This application claims priority under 35 U.S.C. § 119(e) to U.S. Provisional Patent Application No. 62/868,535, entitled "PAYMENT-DRIVEN SOURCING", filed Jun. 28, 2019, and U.S. Provisional Patent Application No. 62/883,374, entitled "DEMAND-BASED PRICING", filed Aug. 6, 2019, which are fully incorporated herein by reference for all purposes.

TECHNICAL FIELD

The present disclosure relates generally to the field of data processing systems and methods, and more particularly to data processing systems and methods that determine a payment that is associated with a consumer profile based on historical transaction data.

BACKGROUND

Internet-based systems and other computer systems that facilitate purchasing (buying or leasing) various goods and services from multiple sellers have become increasingly popular tools for both consumers and sellers. Intermediary search sites allow users to search for items such as vehicles from a large number of available items. When a user selects a vehicle, the intermediary site typically puts the buyer in touch with the dealer to finalize the transaction. The consumer may schedule a test drive with the dealership and may thereafter choose to lease the vehicle. In order to complete the lease transaction, the lease payments and the residual value of the vehicle must typically be determined.

In many conventional internet-based systems for facilitating vehicle purchase or lease transactions, the operators of these systems may be caught in the middle between sellers that want to get high prices for their vehicles and consumers who want to obtain the vehicles at the lowest possible price. The system operator's costs to operate the system and facilitate the transactions may be constrained by the competing interests of the sellers and consumers, so that it is not profitable (or not as profitable as desired) to provide their services in facilitating the transactions. It may therefore be desirable to provide systems and methods for enabling system operators to determine pricing for vehicles such that the operator's business constraints are met.

SUMMARY

Conventional systems do not provide the ability to source the vehicles (purchase them from sellers) in a way that ensures that the system achieves a desired return on the transactions. Embodiments of the present invention may enable sales or lease transactions of inventory items such as vehicles, where the items may be acquired and sold/leased at prices which meet a system operator's business goals as well as a consumer's payment needs.

Systems and methods disclosed herein use information relating to payments by the consumer (e.g., likelihood of converting a transaction), as well as information relating to the system operator's services (e.g., a required level of profitability) to determine which of a seller's products meet the constraints associated with both the consumer and the system operator. The system operator can then acquire these products and present them to the consumer with confidence that the system operator's own requirements, such as a desired net return, can be met. The present systems and methods may process very large quantities of data to enable the system operator to accurately determine the interest of particular consumers in specific types of vehicles, as well as the likelihood that these consumers will transact on the vehicles, thereby allowing the system to be operated to meet the desired goals. By enabling the accurate determination of consumer interest and propensity to transact, the system may also enable the system operator to determine prices at which vehicles can be profitably acquired.

The present disclosure describes a module (which may be referred to herein as a demand module or a pricing module) that implements a demand model to determine a consumer-facing price which will be likely to result in a desired conversion rate, given some set of inputs relating to a particular consumer of interest and a particular product of interest. The consumer-facing price may be determined without regard to the price for a vehicle set by a seller. The consumer-facing price may be used in conjunction with expense information (e.g., costs associated with acquiring the vehicle and operating the system) and information regarding business goals (e.g., a desired rate of return) to determine a target vehicle acquisition price. This target price can be compared to prices which are set by the sellers for their respective vehicles in order to determine which of the vehicles will, if presented to consumers, meet the business goals of the system operator.

In some embodiments, the system implements a demand model that uses very large quantities of historical sales transaction data (essentially all relevant data available from the automotive marketplace) to determine the demand for a particular type of vehicle with respect to a particular type of consumer. The type or profile of the consumer may be an identified segment of the consumer population having characteristics or attributes that fall within predefined ranges. The "type" of vehicle may be defined by characteristics or attributes that are commonly used to distinguish or classify vehicles, such as the make, model and year of the vehicle. The consumer types and vehicle types may have varying levels of granularity in different embodiments, with increasing granularity generally allowing for greater detail and accuracy, but at greater cost (in expense, processing resources and time). Based on the historical data, the demand module can determine how much a given type of consumer is willing to pay for a given type of vehicle.

Embodiments of the invention may include systems, methods and products which determine a consumer-facing price based on collected transactional data. For example, one embodiment is a method for collecting and processing consumer transaction information, generating a demand model, and using the demand model to determine vehicle pricing. This method includes receiving data identifying a first one of a plurality of consumer groups and a first one of a plurality of vehicle types, accessing a demand model that defines a corresponding payment for each of a plurality of combinations of the plurality of consumer groups and the plurality of vehicle types, and generating a first payment corresponding to the first one of the plurality of consumer groups and the first one of the plurality of vehicle types. Each of these steps are performed in this embodiment by a pricing module of the automotive data processing system. In one embodiment, the demand model comprises a machine learning engine which is configured to maintain a set of weights $\beta$ that are included in a predictive demand function of the demand model. The weights may include, for example, include a price weight $\beta_m$, a consumer attribute weight $\beta_U$, and a vehicle attribute weight $\beta_V$, where some of the weights (e.g., consumer attribute weight $\beta_U$ and a vehicle attribute weight $\beta_V$) may comprise vector weights that can independently weight different attributes of the user profile and/or vehicle type. The machine learning engine is configured to adjust the weights to minimize a loss function which measures deviation of demand estimated by the predictive demand function from actual demand indicated by a set of historical transaction data. The historical transaction data may be obtained, for example, from sources external to the automotive data processing system, or it may be collected by tracking and storing the browsing and/or search activities of users of the automotive data processing system.

In one embodiment, the predictive demand function comprises a function $d(m, \vec{U}, \vec{V})$, where $$d(m, \vec{U}, \vec{V}) = \frac{1}{1 + \exp(\beta_0 + \beta_m \cdot m + \vec{\beta}_U \cdot \vec{U} + \vec{\beta}_V \cdot \vec{V} + \vec{\beta}_{U \otimes V} \cdot (\vec{U} \otimes \vec{V}))},$$

and where $\otimes$ represents the Kronecker product, m represents a consumer facing price, $\vec{U}$ represents a set of consumer attributes, and $\vec{V}$ represents a set of vehicle attributes. Since this function relates demand to the consumer facing price, consumer attributes and vehicle attributes, it can be used to generate a demand model from which the consumer facing price can be determined, given the demand and consumer and vehicle attributes. In another embodiment, the predictive demand function comprises a stratified function such as $$d(m, \vec{U}, \vec{V}) = \begin{cases} \dfrac{1}{1 + \exp(\beta_{0,1} + \beta_{m,1} \cdot m + \vec{\beta}_{V,1} \cdot \vec{V})} & \vec{U} \text{ in Group 1} \\ \dfrac{1}{1 + \exp(\beta_{0,2} + \beta_{m,2} \cdot m + \vec{\beta}_{V,2} \cdot \vec{V})} & \vec{U} \text{ in Group 2} \\ \dfrac{1}{1 + \exp(\beta_{0,3} + \beta_{m,3} \cdot m + \vec{\beta}_{V,3} \cdot \vec{V})} & \vec{U} \text{ in Group 3} \end{cases}$$

where m represents a consumer facing price, U represents a set of consumer attributes, and V represents a set of vehicle attributes.

In one embodiment, the demand model measures a conditional conversion probability which indicates a target probability that a consumer with consumer attributes $\vec{U}$ will transact on an offer for a particular vehicle having vehicle attributes $\vec{V}$ through a search function of the automotive data processing system. In another embodiment, the demand model measures a vehicle velocity probability which indicates a target probability that the consumer will transact on an offer for the vehicle within a predetermined time period (e.g., two weeks) from the particular vehicle becoming available through the automotive data processing system. In another embodiment, the demand model measures a click-through rate which indicates a rate at which consumers with consumer attributes $\vec{U}$ will select vehicles having vehicle attributes $\vec{V}$ through a viewing function of the automotive data processing system.

Another embodiment may be a computer-based system that enables consumers to interact with an automotive data processing system from their personal computing devices (e.g., smart phones or laptops) via a network, where the automotive data processing system collects transactional data from the users and generates a demand model that is used to determine pricing for vehicles corresponding to desired business goals (e.g., conversion rate).

Another embodiment may be a computer program product comprising a computer-readable medium that contains instructions executable by a computing device to perform a method for collecting and processing consumer transaction information to generate a demand model which is used to determine vehicle pricing based on a given consumer type and vehicle type.

Many other alternative embodiments may also be possible.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 4 is a flow diagram illustrating a method for generating a demand model in accordance with some embodiments.

FIG. 5 is a flow diagram illustrating the use of a list of qualified vehicles to generate displays responsive to a consumer having a given profile in accordance with one embodiment.

DETAILED DESCRIPTION

Figure 1:
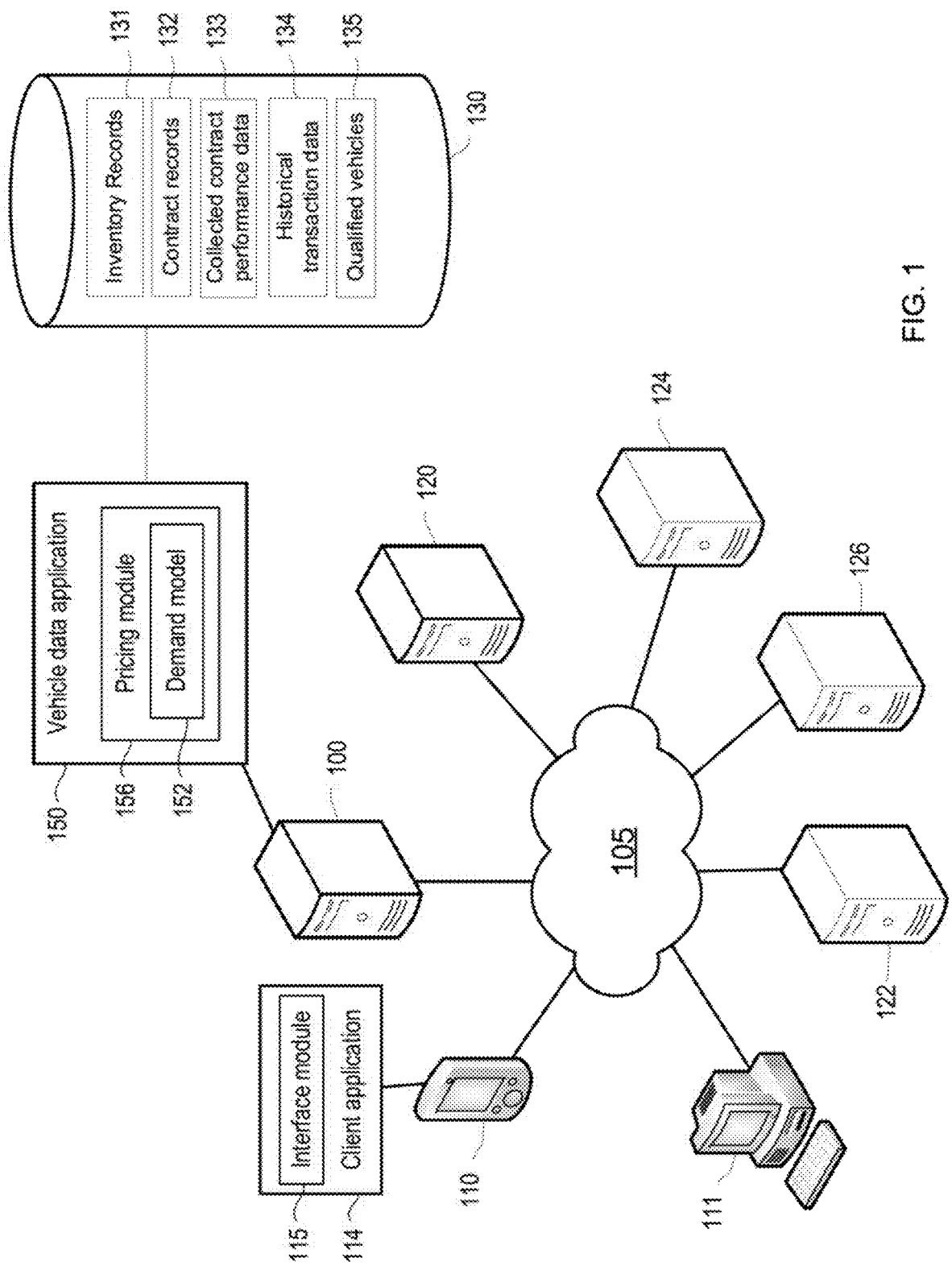
FIG. 1 is a high level block diagram of one embodiment of a network topology.

The invention and various features and advantageous details thereof are explained more fully with reference to the exemplary, and therefore non-limiting, embodiments illustrated in the accompanying drawings and detailed in the following description and appendices. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

The present disclosure is directed to systems, methods and products for generating and using a demand model that determines, based on a specified consumer type and an identified vehicle type, a payment that results in a desired business goal, such as a target conversion rate. The demand model uses historical sales transaction data which is collected and analyzed to determine demand relationships between consumers and vehicles. The historical transaction data may include essentially all of the relevant data that is available from the automotive marketplace. The demand model is used in an automotive data processing system to identify, for a specific consumer in relation to a specific vehicle type, a payment that corresponds to a desired likelihood of the consumer completing a transaction with respect to the identified type of vehicle. This payment may be used, for example, by providing it to a cashflow model which uses this information, along with information such as a desired return on a transaction for the identified type of vehicle, to generate an acquisition target price that is used to qualify vehicles for display to the consumer. In this manner, the use of the demand model enables the system to eliminate vehicles and corresponding transactions that would not be likely to meet the goals of both the consumer and the system operator, making the system more efficient than conventional systems used in vehicle sales transactions.

In some embodiments, the demand model is implemented in the context of an automotive data processing system that is configured to interact with consumers and vehicle sellers (e.g., automotive dealerships) via client applications running on the respective client devices of the users. These systems enable sellers to present vehicles that are available for purchase or lease to consumers. The sellers set purchase prices for the vehicles that are available through the system, and consumers may view the vehicles, potentially choosing to lease one of the viewed vehicles through the system. If this is the case, the automotive data processing system may perform various processing to facilitate the consumer's lease of the vehicle. In some embodiments, if the consumer wishes to proceed with the lease transaction, a selected vehicle is purchased by the automotive data processing system operator and the vehicle is then leased to the consumer. It should be noted that, although the systems and methods described herein focus on the leasing of vehicles to consumers, the demand model should be broadly construed and may be used in other embodiments that involve vehicle purchases, or the leasing or purchase of other types of items.

The system operator is compensated for the services that are provided in association with the lease transaction(s) by pricing the vehicle lease to the consumer at a level which is high enough that it is expected to cover the price at which the vehicle was purchased from the original seller and the associated costs (e.g., cost of capital, marketing, origination, servicing, depreciation, liquidation) and a net return, less the residual value. It is desirable for the operator of the automotive data processing system to be able to ensure that the acquisition price (the price at which the vehicle is required from the original seller) is low enough that the system operator makes a desired return on the vehicle. Because the vehicle seller, rather than the system operator, sets the price at which the vehicle may be acquired by the system operator, the system operator conventionally has no control over this price. The present systems, however, provide means such as the demand model which enable the system to be operated in a way that ensures the consumer payment and vehicle acquisition price are within ranges that achieve the desired return for the system operator on vehicles purchased using the system.

These systems effectively achieve control of the acquisition prices of vehicles that may be purchased by consumers by determining the payments that can be made by consumers, determining the desired return on the system operators investment in the purchased vehicles, determining the acquisition price that is necessary to achieve the desired return, and limiting the vehicles that are available through the system to only those which are priced to provide the desired return. The systems use a demand model to determine the payment corresponding to a particular type of consumer and a particular type of vehicle.

As mentioned above, the demand model is intended to identify a payment at which a consumer having a particular profile is likely to complete a purchase transaction for a vehicle of a given type. In one embodiment, the demand model is developed by examining portions of this transaction data corresponding to particular combinations of consumer profile and vehicle type. The consumer profile may be defined by any suitable set of values for a defined set of factors that might potentially drive the rate of default or return (e.g., FICO score, income, payment-to-income ratio, loan-to-value ratio, down payment amount, recurring monthly payment amount, depreciation, Vehicle Year Make Model Miles, vehicle value, origination location, origination channel (rideshare/consumer), etc.). The vehicle type may be defined by factors such as make and model, or make, model and year.

The interest level of consumers with a particular profile in a particular type of vehicle may be determined in a number of ways. In one embodiment, for each combination of consumer profile and vehicle type, the corresponding records in the historical transaction data can be ranked according to the associated purchase prices. Then, a target price is determined by identifying the price corresponding to a specific percentile of the completed transactions. For example, the 5th percentile may correspond to a target price of $400. Thus, 5% of the consumers that fall within the identified consumer profile will complete a purchase for a vehicle of the identified type if the purchase price is $400. The selected percentile may be increased or decreased, which may in turn affect the pace at which vehicles are purchased through the application. For instance, if a greater percentile is selected (e.g., 6% instead of 5%), the target price will be slightly lower, reflecting the greater number of purchasers at the target price.

In some embodiments, consumer interest may be determined based on a conversion rate. For a given consumer type, the rate at which consumers of that type convert (complete a transaction on a vehicle) will vary with the payment on the particular type of vehicle. Higher payments will normally correspond to lower conversion rates, while lower payments will correspond to higher conversion rates. A payment can be selected by choosing a desired conversion rate and selecting the payment that corresponds to the chosen conversion rate. The conversion rate can be used to select a payment (a simple dollar amount) or a percentage of the vehicle value.

In another embodiment, the level of the consumer's interest can be determined by examining the historical transaction data to determine the likelihood that a vehicle which has been made available through the system for some period of time has been the subject of a transaction (the "vehicle velocity"). For instance, it may be determined what percentage of vehicles of a certain type have been the subject of a transaction when they have been available for two weeks or less. This percentage may be determined as a function of the payments associated with the vehicles. Generally, as the payment increases, the percentage of vehicles that are transacted within the chosen period of time will decrease, reflecting lower consumer interest at the higher payment level.

In another embodiment, the level of the consumer's interest can be determined by examining data that is collected on the consumers' direct interactions with the system.

As consumers browse the vehicles that are available through the system, they will click on vehicles (select listings corresponding to the vehicle) that are of interest in order to view more detailed information on the vehicles. When a consumer clicks on a particular vehicle, this action is recorded by the system, and a "click-through" rate can be determined for each vehicle. Vehicles that generate higher levels of interest will have higher click-through rates. The system can then determine the click-through rate for a particular vehicle type as a function of the payment level for the vehicle type. As the payment level for the vehicle increases, the click-through rate will generally decrease. The system can therefore select a payment for a vehicle type that will produce a desired click-through rate.

Whichever type of analysis is used, a similar analysis is performed for each combination of consumer profile and vehicle type. Thus, for each combination of these inputs (i.e., a given consumer profile and a given vehicle type), the demand model can provide a corresponding target price, based on the selected percentile of transactions to be converted, vehicle velocity, click-through rate, etc.

The payment determined by the demand model is provided, along with a desired return, to a cash flow model which determines a required acquisition price for that type of vehicle which is necessary to ensure the desired return if a consumer make the identified payment for the vehicle. The computed acquisition price can then be compared to vehicles of this type which have been made available by sellers through the system. Available vehicles which have prices at or below the acquisition price may be displayed to consumers (potential purchasers of the vehicles), while available vehicles that have prices above the acquisition price are not displayed. Thus, it will be assured that any purchase transaction that may be completed through the system will provide the desired return on the acquisition cost.

Data processing systems incorporating the disclosed demand model may automate and facilitate purchase processes, including inventory selection, financing qualification and document generation. In an exemplary embodiment, the system facilitates selection of a vehicle by providing vehicle information to a consumer through an interface on a mobile device. In this context, a "consumer" is any individual, group of individuals, or business entity seeking to purchase a vehicle (or other asset) through the system. The consumer may select a particular vehicle that is used as the basis for determining similarity (i.e., the other vehicles are compared to the selected vehicle). The similarity scores are used to identify vehicles similar to the consumer-selected vehicle, and the similar vehicles are presented to the consumer to facilitate the consumer's search for a vehicle that the consumer may wish to purchase.

Some embodiments of a system for facilitating transactions may be implemented in a network topology. FIG. 1 is a high level block diagram of one embodiment of an example topology. The network topology of FIG. 1 comprises an automotive data processing system 100 which is coupled through network 105 to client computing devices 110 (e.g. computer systems, personal data assistants, smart phones or other client computing devices). Network 105 may be, for example, a wireless or wireline communication network such as the Internet or wide area network (WAN), publicly switched telephone network (PSTN) or any other type of communication link. The system may further include one or more information provider systems 120, one or more dealer management systems (DMS) 122, inventory systems 124, department of motor vehicles (DMV) systems 126 or other systems.

Automotive data processing system 100 may provide a comprehensive computer system for automating and facilitating a purchase process including inventory selection, financing qualification, document generation and transaction finalization, as described in detail in U.S. Patent Application Pub. No. 2018/0204281, which is hereby incorporated by reference. The present disclosure focuses primarily on aspects of the system involving inventory selection, and more particularly components of the system relating to the ranking of displayed inventory items, the tracking of user actions associated with the displayed inventory items, and tuning of the ranking engine that generates the ranking of the displayed inventory items.

Using a client application 114 executing on a client device 110, a consumer user may search dealer inventory, apply for financing, select a vehicle of interest from a dealer and review and execute documents related to the purchase of the vehicle, and execute automated clearing housing (ACH) transactions through automotive data processing system 100 to purchase the vehicle from the dealership.

Turning briefly to the various other entities in the topology FIG. 1, dealers may use a dealer management system ("DMS") 122 to track or otherwise manage sales, finance, parts, service, inventory and back office administration needs. Since many DMS 122 are Active Server Pages (ASP) based, data may be obtained directly from a DMS 122 with a "key" (for example, an ID and Password with set permissions within the DMS 122) that enables data to be retrieved from the DMS 122. Many dealers may also have one or more web sites which may be accessed over network 105, where inventory and pricing data may be presented on those web sites.

Inventory systems 124 may be systems of, for example, one or more inventory polling companies, inventory management companies or listing aggregators which may obtain and store inventory data from one or more of dealers (for example, obtaining such data from DMS 122). Inventory polling companies are typically commissioned by the dealer to pull data from a DMS 122 and format the data for use on websites and by other systems. Inventory systems 124 may provide information on inventory vehicles that is used in the ranking of the vehicles when they are presented to a consumer, such as prices of the vehicles and locations of the vehicles.

DMV systems 126 may collectively include systems for any type of government entity to which a user provides data related to a vehicle. For example, when a user purchases a vehicle it must be registered with the state (for example, DMV, Secretary of State, etc.) for tax and titling purposes. This data typically includes vehicle features (for example, model year, make, model, mileage, etc.) and sales transaction prices for tax purposes. Additionally, DMVs may maintain tax records of used vehicle transactions, inspection, mileages, etc.).

Information provider systems 120 may be systems of entities that provide information used in approving a user or purchase. Examples of information provider systems 120 may include computer systems controlled by credit bureaus, fraud and ID vendors, vehicle data vendors or financial institutions. A financial institution may be any entity such as a bank, savings and loan, credit union, etc. that provides any type of financial services to a participant involved in the purchase of a vehicle. Information provider systems 120 may comprise any number of other various sources accessible over network 105, which may provide other types of desired data, for example, data used in identity verification, fraud detection, credit checks, credit risk predictions, income predictions, affordability determinations, residual value determinations or other processes.

Automotive data processing system 100 utilizes interfaces configured to, for example, receive and respond to queries from users at client computing devices 110, interface with information provider systems 120, DMS 122, inventory systems 124 and DMV systems 126, obtain data from or provide data obtained or determined by automotive data processing system 100 to any of information provider systems 120, DMS 122, inventory systems 124, DMV systems 126. It will be understood that the particular interface utilized in a given context may depend on the functionality being implemented by automotive data processing system 100, the type of network utilized to communicate with any particular entity, the type of data to be obtained or presented, the time interval at which data is obtained from the entities, the types of systems utilized at the various entities, etc. Thus, these interfaces may include, for example, web pages, web services, a data entry or database application to which data can be entered or otherwise accessed by an operator, APIs, libraries or other type of interface which it is desired to utilize in a particular context.

Client computing devices 110, 111 may comprise one or more computer systems with central processing units executing instructions embodied on one or more computer readable media where the instructions are configured to interface with automotive data processing system 100. A client computing device 110, 111 may comprise, for example, a desktop, laptop, smart phone or other device. According to one embodiment, a client computing device 110 is a mobile device that has a touchscreen display and relies on a virtual keyboard for consumer data input. Client application 114 may be a mobile application ("mobile app") that runs in a mobile operating system (e.g., Android OS, iOS), and is specifically configured to interface with automotive data processing system 100 to generate application pages for display to a consumer. In another embodiment, the client application 114 may be a web browser on a desktop computer or mobile device. A client computing device 111 may run an application through which a dealer portal can be accessed.

In accordance with one embodiment, a consumer can utilize client application 114 to register with automotive data processing system 100, view inventory, select a vehicle, apply for financing, review documents and finalize a sales transaction through a low friction mobile app running on a smart phone. Client application 114 can be configured with an interface module 115 to communicate data to/from automotive data processing system 100 and generate a user interface for inputting one or more pieces of information or displaying information received from automotive data processing system 100. In some embodiments, the application 114 may comprise a set of application pages through which application 114 collects information from the consumer or which client application 114 populates with data provided via an interface. Application 114 may collect information that is manually input by the consumer so that it can be processed by automotive data processing system 100 with other information associated with the consumer. This information can be used to determine, for example, the consumer's qualification for a vehicle purchase, financing options available to the consumer, or pricing for particular vehicles. Application 114 may also collect automatically information associated with the consumer's views of displayed vehicles and identification of particular vehicles as favorites or subscribed vehicles. This information may be used to tune the weights that are applied to signals input to a ranking engine that determines an order in which vehicles are displayed to the consumer.

Vehicle data application 150 can comprise a set of processing modules to process obtained data or processed data to generate further processed data. Different combinations of hardware, software, and/or firmware may be provided to enable interconnection between different modules of the system to provide for the obtaining of input information, processing of information and generating outputs.

In the embodiment of FIG. 1, vehicle data application 150 includes a pricing module 156 which contains a demand model 152. Demand model 152 uses historical transaction data 134 stored in data store 130 to determine the payments for a consumer having a particular profile that will be likely to result in a completed purchase transaction. Pricing module 156 may also contain a cashflow module that uses contract records 132 and information on customers' performance on those contracts 133. The cashflow model may take input payment information from demand model 152 and information on the desired return for a transaction, from which it can determine an acquisition price for particular types of vehicles. This acquisition price may then be compared to prices set by sellers for inventory vehicles 131 in order to determine which of these vehicles is priced to meet the return requirement. A list of qualified vehicles 135 for the consumer profile (vehicles that are priced at or below the acquisition price for that type of vehicle) can be stored in data store 130 for quick retrieval when a consumer uses the system.

Vehicle data application 150 may also include various other modules which are not described in detail herein. These modules may include, for example, dealer interaction modules, user interaction modules, inventory modules, order modules, financing modules, document modules, and various other modules that may be necessary or desirable to perform the functions of the vehicle data application.

Figure 3:
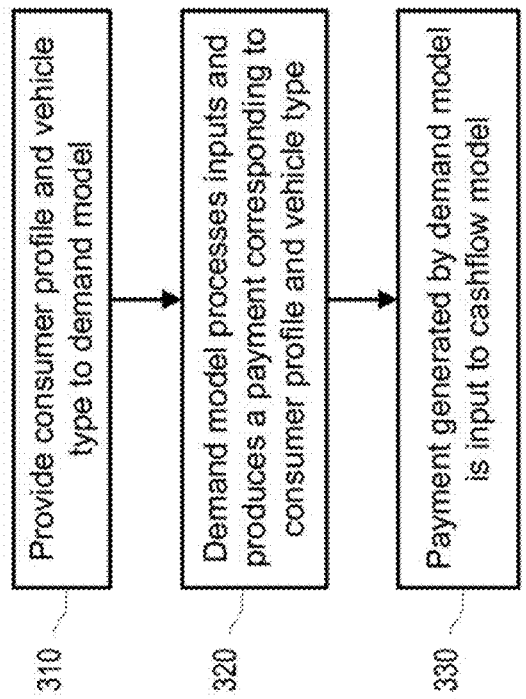
FIG. 3 is a flow diagram illustrating the generation of a consumer payment for a vehicle in accordance with one embodiment.
Figure 2:
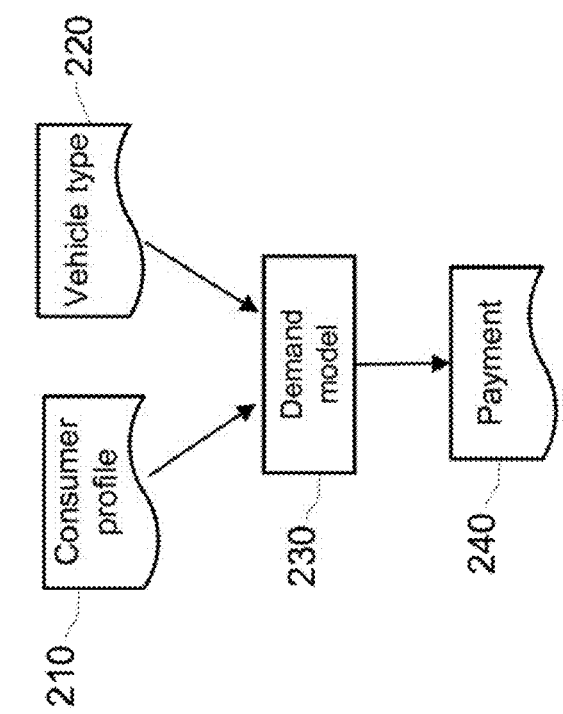
FIG. 2 is a diagram illustrating the operation of an automotive data processing system to generate a consumer payment for a vehicle in accordance with one embodiment.

Referring to FIGS. 2 and 3, diagrams illustrating the operation of an automotive data processing system at a high level in accordance with one embodiment are shown. As depicted in these figures, a consumer profile 210 and a vehicle type 220 are provided to a demand model 230 (step 310). The demand model is derived from historical transaction data that identifies purchase transactions. The historical transaction data may include data collected by the automotive data processing system with respect to consumers that use the system, as well as data that is collected by other entities and is then transferred to the automotive data processing system.

Each of the transaction records has associated consumer information, vehicle type information, and payment information. This information is used by the automotive data processing system to determine the payment levels at which consumers having particular profiles are likely to complete purchase transactions for the identified types of vehicles and to generate a corresponding demand model. Demand model 230 is designed to receive the consumer profile 210 and vehicle type 220 as inputs, process these inputs, and provide the corresponding payment 240 as an output (step 320). It should be noted that the payment is consumer-facing and is generated without regard to a specific vehicle that is being offered for sale or lease by a particular seller, or any costs that may be associated with selling or leasing a vehicle.

The payment 240 that is produced by the demand model for the identified consumer profile and vehicle type may then itself be provided as an input to a cash flow model (step 330). A desired return may also be input to the cash flow model. The cash flow model may be derived from historical contract performance data which is collected by the system. This data can be analyzed to determine the costs associated with transactions involving particular types of vehicles. The cash flow model determines, based upon the input return information and the payment information 240 from demand model 230 a maximum acquisition price that is necessary to provide the desired return for the particular type of vehicle at the payment level indicated by the demand model. The acquisition price, similar to the customer-facing payment, is independent of any particular vehicle that may be available for sale on the system.

The pricing module implemented in the automotive data processing system is a function $\mathcal{P}$ which can be used to find a consumer facing price $\overline{m}$ for a given consumer profile that will achieve goals related to fulfilling some element of demand. In terms of the information signature:

$\mathcal{P}$; user attributes, $\overline{u}$; vehicle attributes, $\overline{v}$; target demand, $\overline{d} \rightarrow$ consumer facing price, $\overline{m}$ $\mathcal{P}$ would have the functional form:

$\mathcal{P}: \overline{m}_{\overline{d}}(\overline{u}, \overline{v})$

For the purposes of this disclosure, bars are used over variables to indicate that the value is set by a policy or the downstream effect of a value set by policy. An arrow symbol over a variable indicates that the variable represents a potentially multi-dimensional vector quantity.

User attributes can include, but are not limited to, attributes from things such as income, FICO score, or other items that may be found in credit bureau reports. The user attributes may be distilled into a single score which reflects a consumer's ability to make payments on a vehicle. Attributes such as the region in which the customer is shopping may be included, since such attributes may affect the consumer's vehicle preferences.

Vehicle attributes may include intrinsic characteristics such as the make, model, mileage, color, year, MSRP or condition of the vehicle. The vehicle attributes could also include, in a dynamic pricing context, attributes related to the historical performance of a specific vehicle within the automotive data processing system. For instance, the vehicle attributes may include the click-through rate on a vehicle relative to a predicted quantity of that vehicle (e.g., a quantity of vehicles of the same make, model and year), or the length of time the vehicle has been available in the system. The vehicle attributes typically would not include variables which would not be consumer-facing, and consequently would not affect or reflect consumer demand. For example, the cost at which a vehicle is being offered by a seller to the operator of the automotive data processing system would not reflect consumer demand and would not be included in the vehicle attributes.

The target demand, $\overline{d}$, may be selected from any number of potential measures of demand. In one embodiment, a conditional conversion probability is used as the measure of target demand. The conditional conversion probability is the target probability that a consumer with attributes $\overline{u}$, having encountered an offer for a particular vehicle through a search feature of the automotive data processing system, will decide to transact on that vehicle. In alternative embodiments, other measures of demand may be used. For example, $\overline{d}$ could be determined by a target probability that a vehicle which has been available to consumers in the automotive data processing system for two weeks has been transacted on by a consumer with attributes $\overline{u}$. This may be referred to as the vehicle velocity. In another alternative embodiment, a target click-through rate when the vehicle is displayed to a user with attributes $\overline{u}$ may be used as a measure of demand. This measure of demand is referred to as a demand model not only because it relates generally to consumer demand, but also in the case of the conditional conversion probability because it refers to a prediction of the quantity of a specific car demanded by a specific consumer profile at a given price. As noted above, however, using granular information about user behavior within the automotive data processing system, the target demand could refer to the relationship between price and other outcomes besides quantity.

Referring to FIG. 4, a flow diagram illustrating a method for generating a demand model in accordance with some embodiments is shown. IN this method, historical transaction data is collected or obtained by the automotive data processing system (410). As noted above, the data may comprise historical contract performance data that is collected by the automotive data processing system. Alternatively, the system may obtain data from external sources that have collected transaction data from sources other than the automotive data processing system.

The historical transaction data in this embodiment is segregated into subsets, each of which corresponds to a particular user group and a particular vehicle type (420). Each of the subsets of data is then analyzed to determine the payment level associated with the subset of data (430). In alternative embodiments, the data may be processed without first segregating the data into subsets. In this case, the user group and vehicle type corresponding to each of the data records is tracked so that the payments corresponding to each of the records can be analyzed with respect to the corresponding user group and vehicle type.

Based on the analysis of the historical transaction data, the automotive data processing system generates a demand model which defines a consumer-facing payment level that is associated with the different user groups and vehicle types (440). More specifically, for each of a defined set of consumer groups and vehicle types, the demand model defines a corresponding payment at which a consumer in a particular group can be expected, with a particular level of confidence, to complete a transaction on a vehicle of a given type. The demand model may be based on various different potential measures of consumer demand, such as a probability of conversion of a transaction, a probability that a vehicle will be transacted upon within a defined time period, or a target click-through rate. When the demand model has been defined, the model is stored (450) so that the pricing module of the automotive data processing system can access the model and use the model to determine a consumer-facing payment corresponding to a given consumer profile and vehicle type.

It should be noted that, although the exemplary method of FIG. 4 uses a stratified approach that stratifies users into discrete groups, the historical transaction data may also be analyzed in a more continuous fashion that can be used to model demand for individual users rather than groups or classifications of users.

The pricing module is powered by a machine learning engine that functions as a predictive demand model, $\mathcal{D}$, where the relevant demand-based outcome is modeled as $\mathcal{D}: \overline{u}, \overline{v}, m \rightarrow d,$ where d is now an estimated demand rather than a target demand.

The descriptions of the examples of estimated demand d would be the same as those of the corresponding targeted demand $\overline{d}$. $\mathcal{D}$ would have the form $\mathcal{D}: d(\overline{u}, \overline{v})$ The model, $\mathcal{D}$, is trained on the automotive data processing system's own historical data. If, as in the examples of demand above, the outcomes are probabilistic and binary, then a logistic model could be used:

$$d(m,\vec{U},\vec{V}) = \frac{1}{1+\exp(\beta_0 + \beta_m \cdot m + \vec{\beta}_U \cdot \vec{U} + \vec{\beta}_V \cdot \vec{V} + \vec{\beta}_{U \otimes V} \cdot (\vec{U} \otimes \vec{V}))},$$

where $\otimes$ represents the Kronecker product.

In an alternative example, if a stratification approach were to be taken for some of the variables, such as by categorizing consumers into groups, then the model could have the form:

$$d(m,\vec{U},\vec{V}) = \begin{cases} \frac{1}{1+\exp(\beta_{0,1} + \beta_{m,1} \cdot m + \vec{\beta}_{V,1} \cdot \vec{V})} & \vec{U} \text{ in Group 1} \\ \frac{1}{1+\exp(\beta_{0,2} + \beta_{m,2} \cdot m + \vec{\beta}_{V,2} \cdot \vec{V})} & \vec{U} \text{ in Group 2} \\ \frac{1}{1+\exp(\beta_{0,3} + \beta_{m,3} \cdot m + \vec{\beta}_{V,3} \cdot \vec{V})} & \vec{U} \text{ in Group 3} \end{cases}$$

Stratification could be performed on different car attributes as well.

The variables may be encoded in various ways, mathematically, but in this sense there is an equivalence between stratification of a model on a variable and inclusion of that variable in the functional form. In either example, model training would be performed to find the optimal values of β to minimize some loss function, $\mathcal{L}$, which is a measure of how much the predictions of the system's model deviate from the true outcomes of the training data. An example of such a loss function could be the log-loss.

The pricing module $\mathcal{P}$ could then be implemented by $$\tilde{m}_{\tilde{d}}(\vec{U},\vec{V}) = m, \text{ such that } d(\vec{U},\vec{V}) = \tilde{d}.$$

This is done in one embodiment by numerically solving the function d for fixed $\vec{U}$ and $\vec{V}$ for m so that d is equal to $\tilde{d}$ to within some tolerance. If the model uses the simple logistic model from above, then the function of the pricing module would be given by the closed form function:

$$\overline{m}_{\tilde{d}}(\vec{U},\vec{V}) = \frac{\ln\left(\frac{1-\tilde{d}}{\tilde{d}}\right) - (\beta_0 + \vec{\beta}_U \cdot \vec{U} + \vec{\beta}_V \cdot \vec{V} + \vec{\beta}_{U \otimes V} \cdot (\vec{U} \otimes \vec{V}))}{\beta_m}$$

A closed form, however, is not generally available.

In practice, for computational efficiency, the results of the pricing module may be pre-computed for each vehicle for a set of user groups and their archetypal users: $\{\vec{U}_i\}$, where i indicates the group of the archetypal users. Example of groups and their archetypal users could be, for example:

Group: "high payment performance customers in Tennessee";
Archetypal User: $\vec{U}_{high,TN}$=(FICO=630, Market=Nashville)
Group: "low payment performance customers in Los Angeles"
Archetypal User: $\vec{U}_{low,LA}$=(FICO=520, Market=Los Angeles)

The price encountered by a user of the app would be the result of sorting the customer into groups using a grouping function, $$g(\vec{U}) = i$$

This function determines to which group a user belongs, and displays the pre-computed price based on the archetypal member of that group:

$$\tilde{m}_{\tilde{d}}(\vec{U},\vec{V}) \rightarrow \tilde{m}_{\tilde{d}}(\vec{U}_{g(\vec{U})},\vec{V})$$

This is noted mainly to clarify that if a specific stratification strategy was used in the function $$d(m,\vec{U},\vec{V}),$$

there is no need for those strata to match the customer groups for matching to the archetypal users. For example, in one embodiment, the function d accepts a continuous value for FICO score, without stratification, but the pricing module may still group consumers into three discrete ranges of FICO, where all consumers within the group are priced according to an archetypal user with the mean FICO score of that group.

As noted above, the payment generated by the pricing module using the demand model may be provided with a desired return to the cash flow model to generate a maximum acquisition price for a vehicle.

The target price output by the demand model corresponding to the identified consumer profile and vehicle type is provided as an input to the cash flow model. The cash flow model is designed to determine the cash flow that is generated by a transaction for a particular type of vehicle at a given price. In one embodiment, the vehicle data system collects information relating to all contracts for vehicle purchases that are made using the system. This information is then used to develop the cash flow model. The collected contract information is used to determine, for a given vehicle type and at a given price, the probabilities that a consumer will maintain the contract, return the vehicle, or default on the contract.

In one embodiment, the cash flow model is developed using a database that is created with attributes which are known at the point of origination and which might potentially drive the rate of default or return on a contract (e.g., FICO score, start payment, regular payment, vehicle year make model miles, vehicle value, origination location, origination channel (rideshare/consumer), etc.). The status of the loan at the beginning and the end of each contract period (defaulted, returned as agreed, actively paying) is also included.

The database contains a row for every contract for every due date from inception of the contract. For example, Rideshare contracts that involve weekly payments have one row per week for every account (e.g., 52 rows for a 1 year old account), while consumer loans which are due for monthly payments have 12 rows of status results for a year. In both cases, the origination attributes are repeated on every row. The database may have hundreds of thousands of rows (records).

An analysis is performed on the records in the database to predict the likelihood of return or default for any configuration of attributes known at origination, for any period in the life of the subscription. The output is a formula that predicts the likelihood of default, return, or continued payment for every invoice period (typically for 36 months in the case of rideshare and 48 months in the case of consumer). In this embodiment, it is assumed that after the full length of the loan period, the customers will return their vehicles.

An example of such a formula may be $$g(\Sigma_{i=1}^{N} f(x_i \beta)),$$

where N is the number of feature attributes in the said model, x is an attribute, β is some estimated coefficient and g is a functional form, and f is also a functional form such as a linear combination.

Based upon these probabilities, the expected net gross cash flow from a contract for this type of vehicle at this price can be determined. The formula for the probabilities of default, return, or continued payment is then put into a model that includes business costs, such as cost of capital, marketing, origination costs, servicing costs, depreciation, and liquidation costs. When these costs are added to the cost of acquisition of the vehicle from the dealer, the result is a gross cash flow expectation for the vehicle.

When the details of any of the previously originated vehicles are input to the model, the model might predict that, on average, the actual payment results in an expected return that is very high, or even possibly negative. Thousands of deals are therefore loaded, one by one, into the model, and are solved for a target return by adjusting the regular payment, saving the regular payment, and then using statistics on the deals with the ideal regular payment (the one that results in the desired return) to develop a general formula using the known origination attributes as inputs to drive a payment appropriate for a deal on a particular type of vehicle.

In one embodiment, a separate filter (not included in the model) is used to exclude certain vehicles which are not good fits with the consumer. For example, the vehicles may be excluded because the payment is not competitive, or because the vehicle is a type that is usually not preferred by the consumer (e.g., pickup trucks are not usually preferred by uber drivers).

In one embodiment, the acquisition price generated by the cashflow model is provided to a comparison engine that receives inventory records corresponding to available inventory vehicles that are available to the automotive data processing system. Each of the vehicle inventory records identifies the corresponding purchase price for the vehicle, which is set by the seller of the vehicle. The comparison engine compares the purchase price for each inventory vehicle (of the type associated with the acquisition price) with the acquisition price and either qualifies or disqualifies the vehicle based upon the comparison. If the purchase price is less than or equal to the acquisition price, the vehicle is qualified, and if the purchase price is greater than the acquisition price, the vehicle is disqualified. Qualified vehicles are then made available to be displayed to consumers through the vehicle data application, while disqualified vehicles are blocked from being displayed to consumers.

As noted above, the acquisition price is associated with a particular consumer profile. As it is determined whether each vehicle is qualified or not, qualified vehicles are added to a list of qualified vehicles for the corresponding consumer profile, while disqualified vehicles are not. This same process is repeated for each of a set of possible consumer profiles so that multiple lists of qualified vehicles are stored by the system, with each list being associated with a corresponding consumer profile. Then, when a specific consumer interacts with the system, one of the consumer profiles which is associated with the consumer is identified and the corresponding list of qualified vehicles is retrieved, and the list is used to identify the vehicles that are qualified for the specific consumer. Since only vehicles that have acquisition prices at or below the acquisition price are qualified for display to the consumer through the application, any purchase or lease transactions that are completed necessarily involve vehicles that are priced at a level sufficient to provide the desired return for the system operator.

Referring to FIG. 5, the use of the qualified vehicle list in accordance with some embodiments is shown. As depicted in this figure, a consumer first logs on to a client application which interacts with the vehicle data application (510). The vehicle data application identifies the consumer profile that is associated with the consumer (520) and then retrieves the corresponding list of qualified vehicles (which was determined based in part upon the payment determined by the demand model) from a data store (530). As noted above, each of the vehicles in the list has been compared to an acquisition price associated with the consumer profile, so it is not necessary to separately qualify vehicles for each consumer, or to expend the time and computational resources necessary to do so when the consumer logs in. After retrieving the list of qualified vehicles, the consumer may interact with the vehicle data application, such as by submitting vehicle queries or browsing vehicle listings (540). The automotive data processing system then generates a display which includes one or more of the qualified vehicles and presents the display on a client device (550). Because the vehicles that are displayed to the consumer responsive to these queries or in the course of browsing are selected from the qualified vehicles that were previously identified by the vehicle data application, it is assured that any transaction completed by the consumer will provide the return desired by the system operator.

It should be noted that the sellers of the vehicles may be provided with the ability to view the vehicles that are displayed to users having particular consumer profiles, and may therefore be able to determine whether or not particular vehicles that they have made available for purchase or lease through the vehicle data system are qualified for display. If a seller determines that a particular vehicle is not being displayed to consumers having a particular profile, the seller may change the purchase price of the vehicle in order to ensure that the vehicle is qualified. In one embodiment, the seller may use a client application which includes a tool such as a slider bar to adjust the price to a level which is at or below the acquisition price corresponding to that type of vehicle, thereby allowing the vehicle to be qualified and displayed to consumers.

Figure 6:
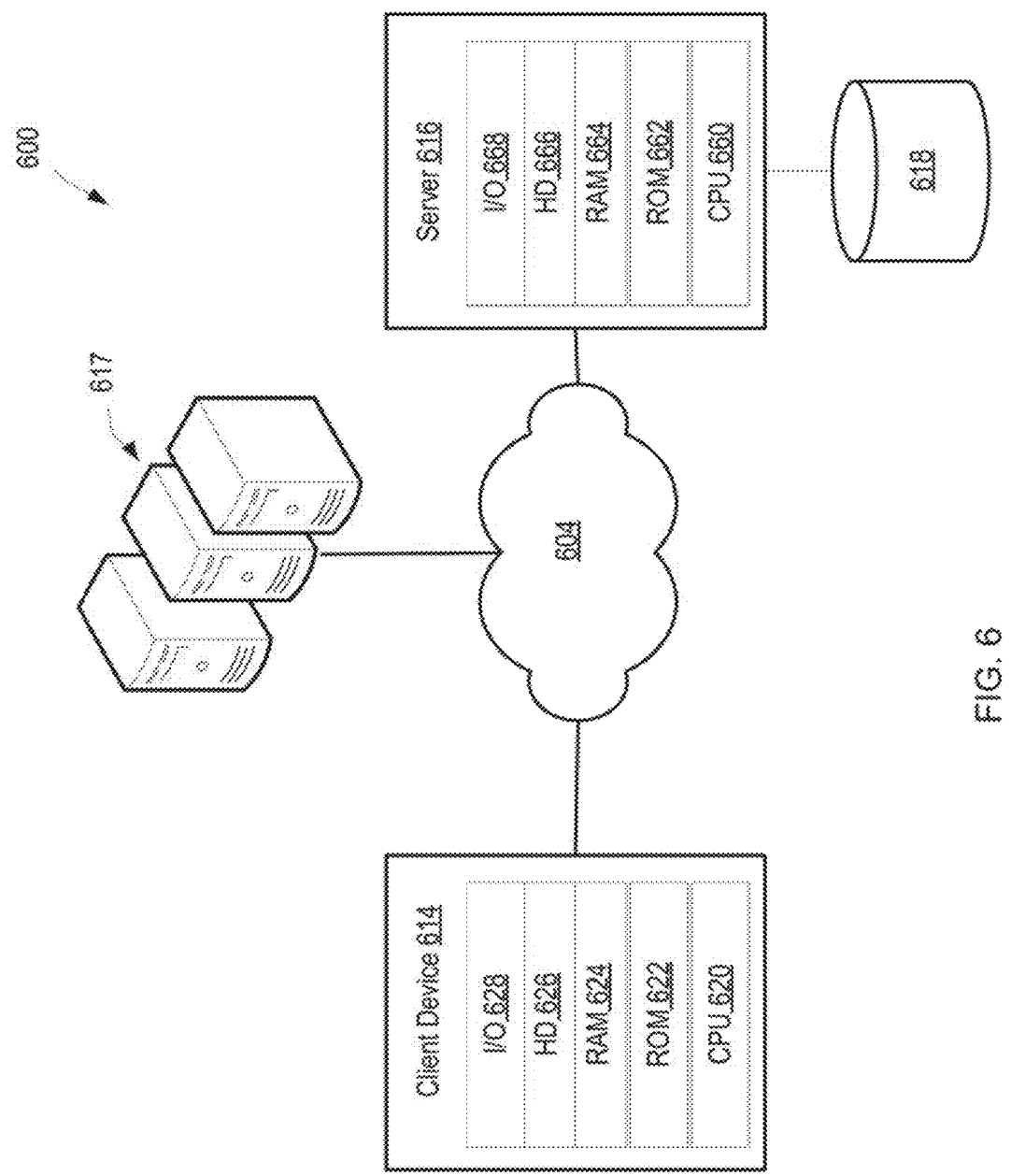
FIG. 6 is a diagrammatic representation of a distributed network computing environment in which some embodiments may be implemented.

Embodiments of the automotive data processing system may be implemented in a variety of different computing systems. FIG. 6 depicts a diagrammatic representation of a distributed network computing environment where embodiments disclosed can be implemented. In the example illustrated, network computing environment 600 includes network 604 that can be bi-directionally coupled to a client computing device 614, a server system 616 and one or more third party system 617. Server system 616 can be bi-directionally coupled to data store 618. Network 604 may represent a combination of wired and wireless networks that network computing environment 600 may utilize for various types of network communications known to those skilled in the art.

For the purpose of illustration, a single system is shown for each of client computing device 614 and server system 616. However, a plurality of computers may be interconnected to each other over network 604. For example, a plurality client computing devices 614 and server systems 616 may be coupled to network 604.

Client computer device 614 can include central processing unit ("CPU") 620, read-only memory ("ROM") 622, random access memory ("RAM") 624, hard drive ("HD") or storage memory 626, and input/output device(s) ("I/O") 628. I/O 628 can include a keyboard, monitor, printer, electronic pointing device (e.g., mouse, trackball, stylus, etc.), or the like. In one embodiment I/O 628 comprises a touch screen interface and a virtual keyboard. Client computer device 614 may implement software instructions to provide a client application configured to communicate with an automotive data processing system. Likewise, server system 616 may include CPU 660, ROM 662, RAM 664, HD 666, and I/O 668. Server system 616 may implement software instructions to implement a variety of services for an automotive data processing system. These services may utilize data stored in data store 618 and obtain data from third party systems 617. Many other alternative configurations are possible and known to skilled artisans.

Each of the computers in FIG. 6 may have more than one CPU, ROM, RAM, HD, I/O, or other hardware components. For the sake of brevity, each computer is illustrated as having one of each of the hardware components, even if more than one is used. Each of computers 614 and 616 is an example of a data processing system. ROM 622 and 662; RAM 624 and 664; HD 626, and 666; and data store 618 can include media that can be read by CPU 620 or 660. Therefore, these types of memories include non-transitory computer-readable storage media. These memories may be internal or external to computers 614 or 616.

Portions of the methods described herein may be implemented in suitable software code that may reside within ROM 622 or 662; RAM 624 or 664; or HD 626 or 666. The instructions may be stored as software code elements on a data storage array, magnetic tape, floppy diskette, optical storage device, or other appropriate data processing system readable medium or storage device.

While the foregoing embodiments were provided primarily in the context of an automotive data processing system, it will be appreciated that embodiments described herein may be applied to other assets (e.g., real-estate, boats, etc.). In particular, embodiments may be adapted for assets for which depreciation can be modeled. Moreover, those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

Any suitable programming language can be used to implement the routines, methods or programs of embodiments of the invention described herein. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage media, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B are true (or present).

To the extent particular values are provided in any example embodiments in the description, such values are provided by way of example and not limitation. Moreover, while in some embodiments rules may use hardcoded values, in other embodiments rules may use flexible values. In one embodiment, one or more of the values may be specified in a registry, allowing the value(s) to be easily updated without changing the code. The values can be changed, for example, in response to analyzing system performance.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method implemented in an automotive data processing system, the method comprising:
    receiving, by a pricing module of an automotive data processing system, data identifying a first one of a plurality of consumer groups and a first one of a plurality of vehicle types;
    accessing, by the pricing module of the automotive data processing system, a demand model that defines, for each of a plurality of combinations of the plurality of consumer groups and the plurality of vehicle types, a corresponding payment; and
    generating, by the pricing module of the automotive data processing system, a first payment corresponding to the first one of the plurality of consumer groups and the first one of the plurality of vehicle types;
    wherein the demand model comprises a machine learning engine, wherein the machine learning engine is configured to maintain a set of weights $\beta$ that are included in a predictive demand function of the demand model, wherein the machine learning engine is configured to adjust the weights to minimize a loss function which measures deviation of demand estimated by the predictive demand function from actual demand indicated by a set of historical transaction data;
    wherein the predictive demand function comprises a stratified function $d(m, \vec{U}, \vec{V})$, where $$d(m, \vec{U}, \vec{V}) = \begin{cases} \dfrac{1}{1 + \exp(\beta_{0,1} + \beta_{m,1} \cdot m + \vec{\beta}_{V,1} \cdot \vec{V})} & \vec{U} \text{ in Group 1} \\ \dfrac{1}{1 + \exp(\beta_{0,2} + \beta_{m,2} \cdot m + \vec{\beta}_{V,2} \cdot \vec{V})} & \vec{U} \text{ in Group 2} \\ \dfrac{1}{1 + \exp(\beta_{0,3} + \beta_{m,3} \cdot m + \vec{\beta}_{V,3} \cdot \vec{V})} & \vec{U} \text{ in Group 3} \end{cases}$$

and where m represents a consumer facing price, $\vec{U}$ represents a set of consumer attributes, and $\vec{V}$ represents a set of vehicle attributes.

2. The method of claim 1, wherein the weights include a price weight $\beta_m$, a consumer attribute weight $\beta_U$, and a vehicle attribute weight $\beta_V$.

3. The method of claim 2, wherein the consumer attribute weight $\beta_U$, and the vehicle attribute weight $\beta_V$ comprise vector weights.

4. The method of claim 1, wherein the predictive demand function comprises a function $d(m, \vec{U}, \vec{V})$, where $$d(m, \vec{U}, \vec{V}) = \dfrac{1}{1 + \exp(\beta_0 + \beta_m \cdot m + \vec{\beta}_U \cdot \vec{U} + \vec{\beta}_V \cdot \vec{V} + \vec{\beta}_{U \otimes V} \cdot (\vec{U} \otimes \vec{V}))},$$

and where $\otimes$ represents the Kronecker product, m represents a consumer facing price, $\vec{U}$ represents a set of consumer attributes, and $\vec{V}$ represents a set of vehicle attributes.

5. The method of claim 1, further comprising tracking activities of one or more users of the automotive data processing system and storing data corresponding to the activities of the one or more users, wherein the set of historical transaction data comprises the stored data corresponding to the activities of the one or more users.

6. The method of claim 1, wherein the demand model measures a conditional conversion probability which indicates a target probability that a consumer with consumer attributes $\vec{U}$ will transact on an offer for a particular vehicle having vehicle attributes $\vec{V}$ through a search function of the automotive data processing system.

7. The method of claim 1, wherein the demand model measures a vehicle velocity probability which indicates a target probability that a consumer with consumer attributes $\vec{U}$ will transact on an offer for a particular vehicle having vehicle attributes $\vec{V}$ through a search function of the automotive data processing system within a predetermined time period from the particular vehicle becoming available through the automotive data processing system.

8. The method of claim 1, wherein the demand model measures a click-through rate which indicates a rate at which consumers with consumer attributes $\vec{U}$ will select vehicles having vehicle attributes $\vec{V}$ through a viewing function of the automotive data processing system.

9. An automotive data processing system comprising:
one or more processors communicatively coupled to one or more data storage devices, the one or more processors coupled to a non-transitory computer-readable medium that stores instructions which are executable by the processor to cause the processor to execute an automotive data processing system which is configured to perform:
receiving, by a pricing module of an automotive data processing system, data identifying a first one of a plurality of consumer groups and a first one of a plurality of vehicle types;
accessing, by the pricing module of the automotive data processing system, a demand model that defines, for each of a plurality of combinations of the plurality of consumer groups and the plurality of vehicle types, a corresponding payment;
and generating, by the pricing module of the automotive data processing system, a first payment corresponding to the first one of the plurality of consumer groups and the first one of the plurality of vehicle types;
wherein the demand model comprises a machine learning engine, wherein the machine learning engine is configured to maintain a set of weights β that are included in a predictive demand function of the demand model, wherein the machine learning engine is configured to adjust the weights to minimize a loss function which measures deviation of demand estimated by the predictive demand function from actual demand indicated by a set of historical transaction data;
wherein the predictive demand function comprises a stratified function d(m, $\vec{U}$, $\vec{V}$), where $$d(m, \vec{U}, \vec{V}) = \begin{cases} \dfrac{1}{1 + \exp(\beta_{0,1} + \beta_{m,1} \cdot m + \vec{\beta}_{V,1} \cdot \vec{V})} & \vec{U} \text{ in Group 1} \\ \dfrac{1}{1 + \exp(\beta_{0,2} + \beta_{m,2} \cdot m + \vec{\beta}_{V,2} \cdot \vec{V})} & \vec{U} \text{ in Group 2} \\ \dfrac{1}{1 + \exp(\beta_{0,3} + \beta_{m,3} \cdot m + \vec{\beta}_{V,3} \cdot \vec{V})} & \vec{U} \text{ in Group 3} \end{cases}$$

and where m represents a consumer facing price, $\vec{U}$ represents a set of consumer attributes, and $\vec{V}$ represents a set of vehicle attributes.

10. The automotive data processing system of claim 9, wherein the weights include a price weight $\beta_m$, a consumer attribute weight $\beta_U$, and a vehicle attribute weight $\beta_V$, wherein the consumer attribute weight $\beta_U$, and the vehicle attribute weight $\beta_V$ comprise vector weights.

11. The automotive data processing system of claim 9, further comprising tracking activities of one or more users of the automotive data processing system and storing data corresponding to the activities of the one or more users, wherein the set of historical transaction data comprises the stored data corresponding to the activities of the one or more users.

12. The automotive data processing system of claim 9, wherein the demand model measures one or more of: a conditional conversion probability which indicates a target probability that a consumer with consumer attributes $\vec{U}$ will transact on an offer for a particular vehicle having vehicle attributes $\vec{V}$ through a search function of the automotive data processing system; a vehicle velocity probability which indicates a target probability that the consumer with consumer attributes $\vec{U}$ will transact on the offer for the particular vehicle having vehicle attributes $\vec{V}$ within a predetermined time period from the particular vehicle becoming available through the automotive data processing system; and a click-through rate which indicates a rate at which consumers with consumer attributes $\vec{U}$ will select vehicles having vehicle attributes $\vec{V}$ through a viewing function of the automotive data processing system.

13. A computer program product for generating vehicle encodings, the computer program product comprising a non-transitory computer-readable medium storing instructions executable by a processor to cause the processor to perform:
receiving, by a pricing module of an automotive data processing system, data identifying a first one of a plurality of consumer groups and a first one of a plurality of vehicle types;
accessing, by the pricing module of the automotive data processing system, a demand model that defines, for each of a plurality of combinations of the plurality of consumer groups and the plurality of vehicle types, a corresponding payment;
and generating, by the pricing module of the automotive data processing system, a first payment corresponding to the first one of the plurality of consumer groups and the first one of the plurality of vehicle types;
wherein the demand model comprises a machine learning engine, wherein the machine learning engine is configured to maintain a set of weights β that are included in a predictive demand function of the demand model, wherein the machine learning engine is configured to adjust the weights to minimize a loss function which measures deviation of demand estimated by the predictive demand function from actual demand indicated by a set of historical transaction data;
wherein the predictive demand function comprises a stratified function d(m, $\vec{U}$, $\vec{V}$), where $$d(m, \vec{U}, \vec{V}) = \begin{cases} \dfrac{1}{1 + \exp(\beta_{0,1} + \beta_{m,1} \cdot m + \vec{\beta}_{V,1} \cdot \vec{V})} & \vec{U} \text{ in Group 1} \\ \dfrac{1}{1 + \exp(\beta_{0,2} + \beta_{m,2} \cdot m + \vec{\beta}_{V,2} \cdot \vec{V})} & \vec{U} \text{ in Group 2} \\ \dfrac{1}{1 + \exp(\beta_{0,3} + \beta_{m,3} \cdot m + \vec{\beta}_{V,3} \cdot \vec{V})} & \vec{U} \text{ in Group 3} \end{cases}$$

and where m represents a consumer facing price, $\vec{U}$ represents a set of consumer attributes, and $\vec{V}$ represents a set of vehicle attributes.

14. The computer program product of claim 13, wherein the weights include a price weight $\beta_m$, a consumer attribute weight $\beta_U$, and a vehicle attribute weight $\beta_V$, wherein the consumer attribute weight $\beta_U$, and the vehicle attribute weight $\beta_V$ comprise vector weights.

15. The computer program product of claim 13, further comprising tracking activities of one or more users of the automotive data processing system and storing data corresponding to the activities of the one or more users, wherein the set of historical transaction data comprises the stored data corresponding to the activities of the one or more users.

16. The computer program product of claim 13, wherein the demand model measures one or more of: a conditional conversion probability which indicates a target probability that a consumer with consumer attributes $\vec{U}$ will transact on an offer for a particular vehicle having vehicle attributes $\vec{v}$ through a search function of the automotive data processing system; a vehicle velocity probability which indicates a target probability that the consumer with consumer attributes $\vec{u}$ will transact on the offer for the particular vehicle having vehicle attributes $\vec{v}$ within a predetermined time period from the particular vehicle becoming available through the automotive data processing system; and a click-through rate which indicates a rate at which consumers with consumer attributes $\vec{u}$ will select vehicles having vehicle attributes $\vec{v}$ through a viewing function of the automotive data processing system.

* * * * *